TIME-SHARED ANALOG COMPUTER

Filed May 13, 1964 3 Sheets-Sheet 1

Dec. 10, 1968 TAKEO MIURA ET AL 3,415,982

TIME-SHARED ANALOG COMPUTER

Filed May 13, 1964 3 Sheets-Sheet 2

3,415,982

TIME-SHARED ANALOG COMPUTER

Takeo Miura, Kitatama-gun Tokyo-to, and Junzo Iwata, Kodaira-shi, Japan, assignors to Kabushiki Kaisha Hitachi Seisakusho, Tokyo-to, Japan, and Hitachi Denshi Kabushiki, Kaisha, Kodaira-shi, Japan, both joint-stock companies of Japan Filed May 13, 1964, Ser. No. 366,954
Claims priority, application Japan, May 15, 1963, 38/24,163
1 Claim. (Cl. 235—184)

ABSTRACT OF THE DISCLOSURE

A time-shared analog computer having a plurality of integrators, so constructed that each integrator is caused to accomplish computation with foreshortened time axis and to maintain a "hold" state at times other than its computation time without any hold circuit.

This invention relates to analog computers, and more particularly it relates to a new time-shared analog computer in which the number of computating circuit elements is reduced by utilization of a time-sharing method.

In many cases where the computer setup in an analog computer is to be designed or where an analog simulator for a special problem is to be designed, a large number of nonlinear elements having the same characteristics are used in the computer setup. The use of such a large number of nonlinear elements gives rise to certain disadvantages as will be described hereinafter more fully.

It is an object of the present invention to provide a time-shared analog computer in which the number of nonlinear and linear elements is reduced by utilization of a time-sharing system.

It is another object to provide a time-shared analog computer of the above stated character the principle of which is applicable to a wide range of analog computer circuits.

With the foregoing objects and other objects, as will presently become apparent as the description proceeds, in view, the present invention resides in the arrangement and combination of parts as hereinafter more fully set forth, reference being made to the accompanying drawings in which like parts are designated by like reference characters, and in which.

Figure 6I:
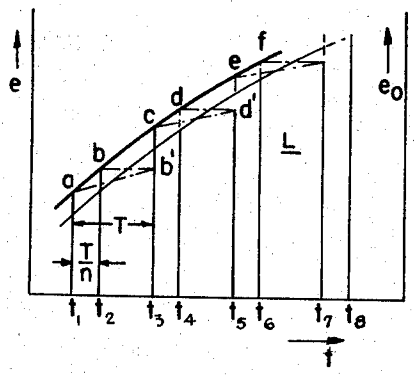
Figure 6:
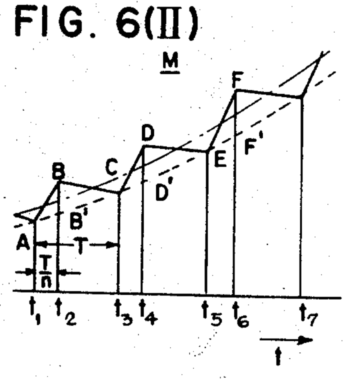
Figures 7I, 8, 9A:
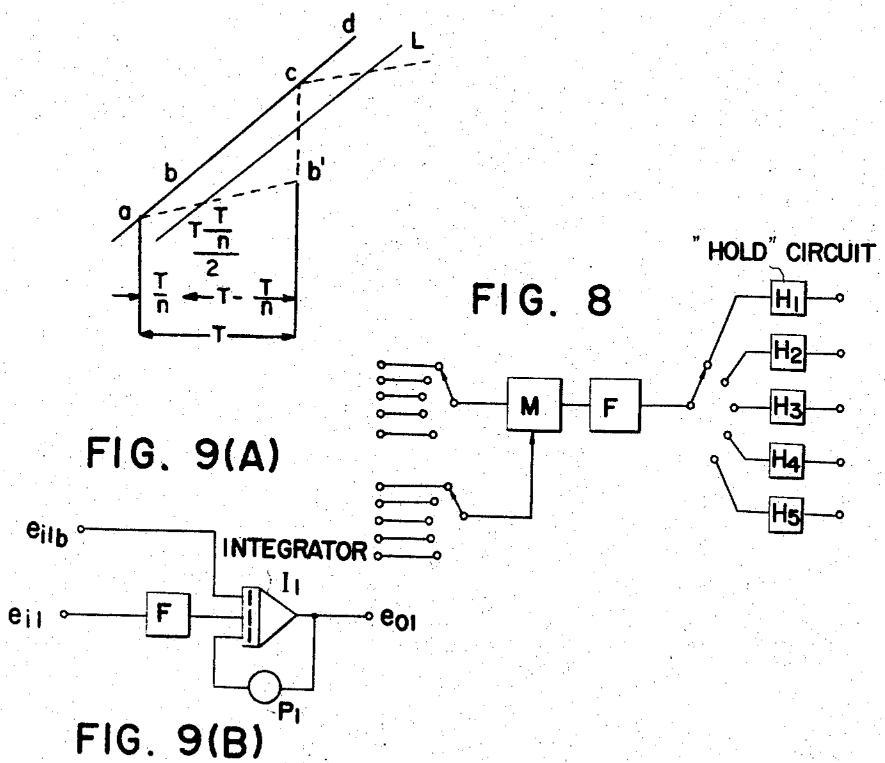
Figure 9B:
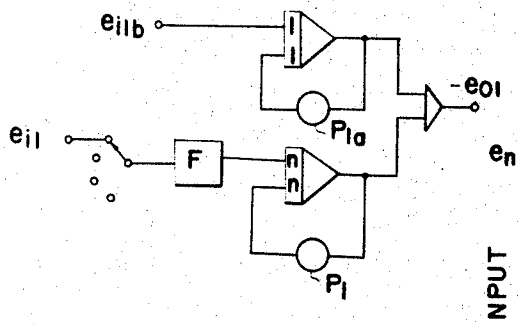
Figure 10:
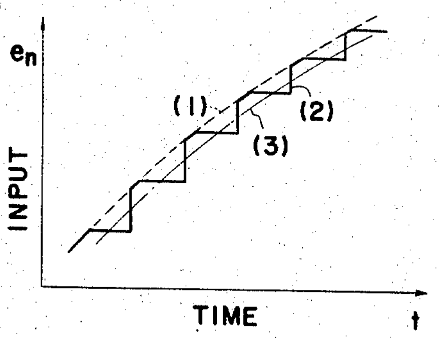
Figure 7:
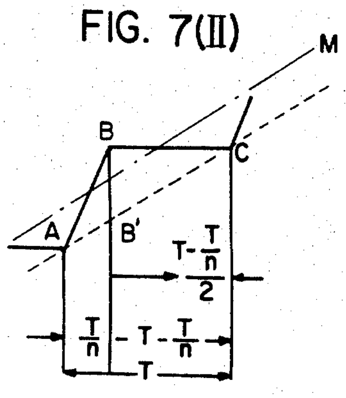

FIGS. 6(I) and 6(II) are graphical representative indicating input and output waveforms;

FIGS. 7(I) and 7(II) are enlargements of FIGS. 6(I) and 6(II), wherein the input is approximated by a straight line;

FIG. 8 is a block diagram to be referred to in a description of a conventional time-sharing computation system;

FIG. 9(A) is a schematic diagram of an integrator;

FIG. 9(B) is a schematic diagram of another form of integrator showing an example of modification of the present invention; and FIG. 10 is a graphical representation indicating input waveforms.

An example of the aforementioned nonlinear elements is a multiplier, which has the same input and output characteristics regardless of the part of a computer setup in which it is used. Furthermore, in the case of solving a partial differential equation by transformation into a difference equation, or in the case of a simulator wherein there are a large number of elements having the same characteristics in the objective system to be simulated, a large number of function generators in which the same function is set is necessary. For example, let it be assumed that in the example of a conventional computer setup shown in FIG. 1, there are provided multipliers $M_1$, $M_2$, $M_3$ . . . , function generators $F_1$, $F_2$, $F_3$ . . . in which the same function is set, integrators $I_1$, $I_2$, $I_3$ . . . , and potentiometers $P_1$, $P_2$, $P_3$, and inputs and outputs are respectively indicated by $e_{i1}$, $e_{i1a}$, $e_{i2}$, $e_{i2a}$, $e_{i3}$, $e_{i3a}$, and $e_{o1}$, $e_{o2}$, $e_{o3}$ . . . . (The details of these multipliers, function generators and integrators are disclosed, for example, in "Electronic Analog Computers" by Korn and Korn, McGraw-Hill Book Company Inc., 1956.) In such a case wherein a computer setup is to be composed of a large number of computating elements of the same characteristics, the number of nonlinear elements such as multipliers and function generators arranged in a general-purpose analog computer is limited. Consequently, this number may be insufficient in some cases for the solution of the given problem. Furthermore, in the case also when a simulator is to be constructed, nonlinear elements, in general, are of higher price than linear elements, and, moreover, the apparatus tends to be come large in size. Accordingly, it is highly desirable that the number of elements installed be reduced as much as possible.

Figure 1:
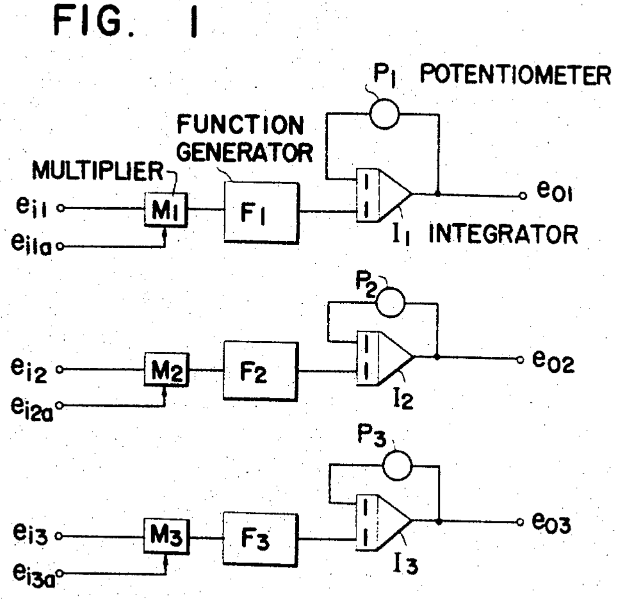
FIG. 1 is a schematic diagram, in block form, showing one example of a conventional computer setup comparable to the computer according to the present invention.

The present invention contemplates providing, in a computer setup having in the stages preceding a large number of integrators respective computating elements of the same characteristics, for example, as shown in FIG. 1, means to control by a unique method to be described hereinafter the integrators and thereby to accomplish time-shared computation, and thereby providing an analog computer in which the required number of computating elements of the same characteristics is reduced.

Figure 2:
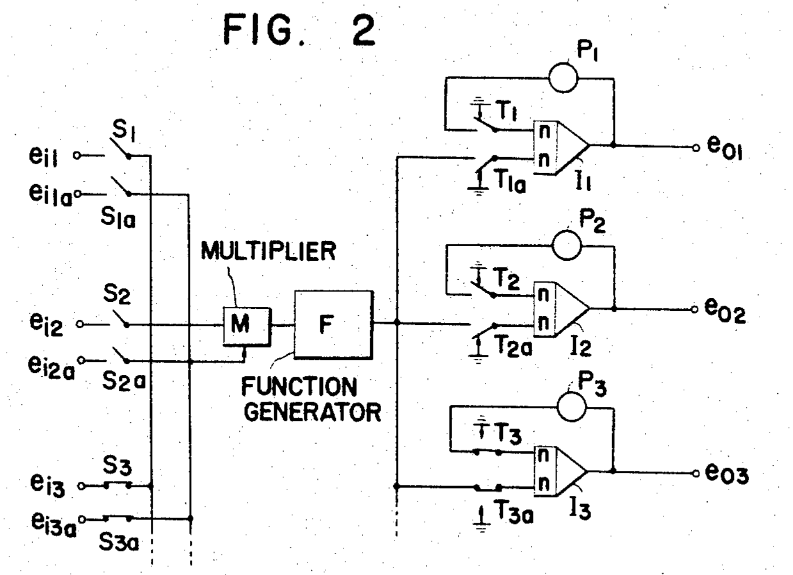
FIG. 2 is a similar schematic diagram showing a preferred embodiment of the computer according to the invention.

In one embodiment as shown in FIG. 2 of the invention applied to the computer setup shown in FIG. 1, the operational functions of the multipliers $M_1$, $M_2$, $M_3$ . . . and function generators $F_1$, $F_2$, $F_3$ . . . belonging to the several sets (channels) in the case shown in FIG. 1 are assumed by a single multiplier M and a single function generator F. The inputs are introduced through input changeover switches $S_1$, $S_{1a}$, $S_2$, $S_{2a}$, $S_3$, $S_{3a}$ . . . , and the output is distributed through output changeover switches $T_1$, $T_{1a}$, $T_2$, $T_{2a}$, $T_3$, $T_{3a}$ . . . .

During operation, the switches with subscript denotation 1, that is $S_1$, $S_{1a}$ and $T_1$, $T_{1a}$ are first closed respectively for a predetermined time, and then, when these switches are opened, those with subscript denotation 2, that is $S_2$, $S_{2a}$ and $T_2$, $T_{2a}$ are closed, this process being similarly accomplished thereafter in sequence by the switches with subscript denotation 3, 4 . . . . Then, when the final switches have been opened, the operational sequence returns to the channel 1 connected by the switches with subscript denotation 1, and the same operation is repeated.

Figure 4:
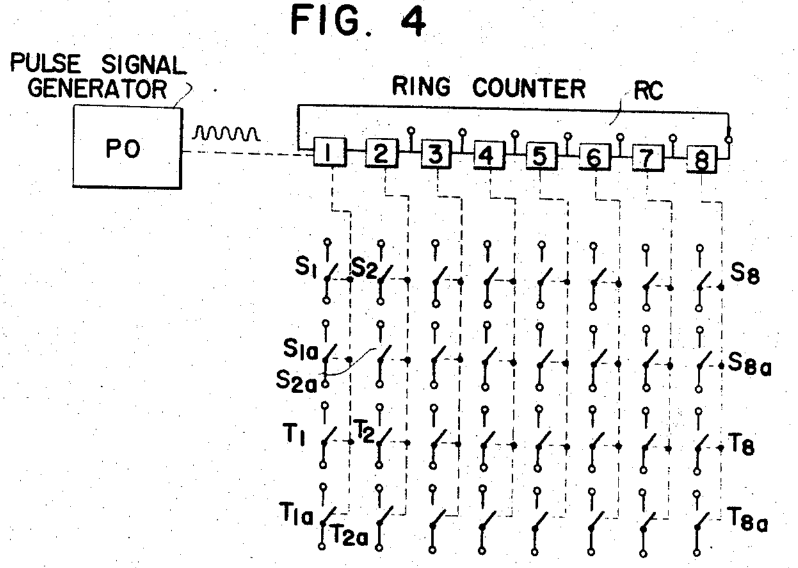
FIG. 4 is a schematic diagram showing one example of control means consisting of a large number of control switches.

The opening and closing control of the above mentioned input changeover and output changeover switches is accomplished by means such as, for example, the means shown in FIG. 4, in which there is provided a pulse signal generator PO to generate pulse signals of constant period and a ring counter RC.

The opening and closing control of the above mentioned changeover switches is accomplished by the outputs of the stages 1, 2, 3 . . . of the ring counter RC respectively corresponding to the subscripts of the said switches. These switches are either mechanical switches or electronic switches.

Considered separately, each of these switches opens and closes periodically. For the following description, the period for the aforementioned pulse to cause the ring counter to perform one round of operation cycle will be denoted by $T_o$, and the time during which the individual switch is closed will be represented by $t_o/n$.

Let it be asumed that the time scale factor of the computer setup which computes by receiving the output of the nonlinear elements M and F of this circuit is contracted to $1/n$ times that in the case of the arrangement shown in FIG. 1. This contraction can be attained by causing the time constant of each integrator to be $1/n$.

(Here, the adjustment of the time constant of the integrators has been also well known; see the above cited reference.)

As shown in FIG. 2, the other inputs of the integrators, which in FIG. 2 are the inputs from the potentiometers $P_1, P_2, \ldots$ are also switched simultaneously by the switches $T_1, T_2, \ldots$ respectively. Accordingly, when these switches are not closed, no computation takes place in the corresponding computer setup, which is then in a "hold" state. In FIG. 2, the state shown is that wherein the computer set-up containing the integrator $I_3$ is computing with a time axis foreshortened to $1/n$, and the other computer setups are in the "hold" state.

Figure 3:
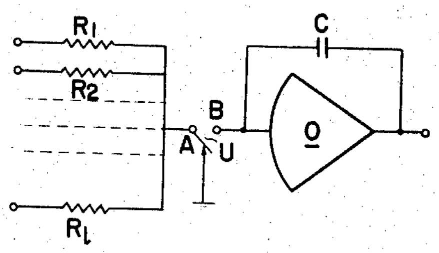
FIG. 3 is a schematic diagram indicating the composition and arrangement of an analog integrator.

A low-speed integrator ordinarily has a switch U at its addition point as shown in FIG. 3. Throwing of this switch U to its side A produces the "hold" state, and throwing thereof to its side B causes computation. (The method for producing the hold state of the integrator is well known; see the above cited reference.) Accordingly, if, instead of actuating the aforementioned switches $T_j$, $T_{ja}$ (where $j=1, 2, 3 \ldots$) simultaneously, the switch U is caused to operate, the circuitry can be simplified. Since each computer thus carries out computation only during $1/n$ of one period, the nonlinear elements can be reduced in number to $1/n$ of that in the case wherein, as shown in FIG. 1, several computer setups are provided. That is, only one of M and F are sufficient.

Figure 5:
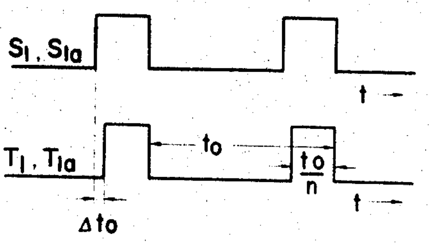
FIG. 5 is a graphical time chart for the case wherein control switches are opened and closed.

However, in the case wherein the frequency characteristics of the nonlinear elements are poor, satisfactory results can be obtained by closing the output changeover switches $T_j$ and $T_{ja}$ after a time interval $\Delta t_o$ from the instant of closure of the input changeover switches $S_j$ and $S_{ja}$ as indicated in FIG. 5, the time interval $\Delta t_o$ being that from the instant of closure of the switches $S_j$ and $S_{ja}$ up to the instant when the output of the nonlinear elements follows up the input. At this time, the number of nonlinear elements is not exactly $1/n$ but becomes approximately $1/n$.

The computation result obtained in the above described manner is substantially equal to that obtained in the case when time-sharing is not carried out provided that the period $t_o$ is sufficiently shorter than the fluctuation period of the computation solution, as will be apparent from the following consideration.

Referring to FIGS. 6(I) and 6(II) which indicate input and output waveforms of said integrator of one channel, the input waveform of said integrator (the output waveform of said function generator), not time-shared, is shown by the solid line *a, b, c, d, e, f* . . . in FIG. 6(1), and only the portions represented by *ab, cd, ef* . . . are utilized for the computation on this channel.

The output of the integrator shown in FIG. 6(II) has a wave in the form of a staircase defined by A, B, C, D, E . . . . In FIGS. 6(I) and 6(II), if the time axis is extended by a factor $n$ at every period for both input and output so that the computation time covers the period T; in other words, if the waveform existing between $t_1$ and $t_2$ is elongated to exist between $t_1$ and $t_3$, whereby the output holding period at the time of computation being not carried out is eliminated, the input and output waveforms become $a, b_a, c, d_a \ldots$ and $A, B_a, C, D_a \ldots$ respectively. This means that, if the input of waveform $a, b_a, c, d_a \ldots$ in FIG. 6(I) enters a computing circuit which has the time-constant multiplied by $n$, that is, said integrator, the output waveform becomes $A, B_a, C, D_a \ldots$.

Designated as "elongation" is a process of deriving the waveform $a, b_a, c, d_a \ldots$ from the original input waveform $a, b, c, d \ldots$ and designated as "compression" is a process of deriving the waveform A, B, C, D . . . from the waveform $A, B_a, C, D_a \ldots$. Then, the output A, B, C, D . . . will be obtained when the output waveform of the function generator picked up to $T/n$ at every period T is elongated and compressed after passing through said integrator.

The chain line L, which indicates the average of the elongated staircase waveform $a, b_a, c, d_a \ldots$ is delayed by $$\frac{T}{2}-\frac{T}{n}$$

with respect to the input waveform as shown in FIG. 7(I). The reason for this is that connection of the midpoints of $a, b_a, c, d_a \ldots$ may result in the average output L which eventually passes the midpoint of $bb_a$. Average waveform M for the waveform A, B, C, D . . . results from compression of $A, B_a, C, D_a \ldots$ which is the output from the integrator when said elongated waveform enters into the integrator is advanced in time by $$\frac{T}{2}-\frac{T}{n}$$

with respect to the waveform $A, B_a, C, D_a \ldots$ shown in FIG. 7(II). So far as the average waveform is concerned, the $$\frac{T}{2}-\frac{T}{n}$$

delay by elongation and $$\frac{T}{2}-\frac{T}{n}$$

advancement by compression, while passing through the integrator in between, corresponds to a signal passage of the original waveform through the integrator. Therefore, if this integrator and subsequent circuit are insensitive to any vibration having a period T and show quite the same response to both a staircase waveform or its smoothened waveform, no error will be caused by the time-shared computation.

Strictly speaking, the assumptions made in the above description are not fully valid in actual practice. However, since an analog computer ordinarily is assembled with integrators as its principal components and its response to higher frequencies is usually low, it is possible, without using any hold circuit, to maintain the error due to this manner of time-sharing within the given allowable error range provided that the period $t_o$ of repetition of the time-sharing is selected to be sufficiently small.

In contrast, according to the conventional method indicated in FIG. 8 wherein the inputs and outputs of the nonlinear elements to be time-shared are switched synchronously, it is necessary to provide "hold" circuits $H_1, H_2, H_3 \ldots$ after the switching elements and this is uneconomical. (If the "hold" circuits were not used, computation would be carried out with zero input while computation is being carried out in another channel, and the error would become large.) Furthermore, a signal which is in such a "sample hold" state is equivalent to a signal obtained by delaying the original by a certain time as indicated in FIG. 10 even when the sampling period is less than the computation period. In FIG. 10, the dotted line 1 represents the input to the following circuit when time-sharing is not accomplished, the full line 2 represents the input when time-sharing is being carried out, and the chain line 3 represents the time mean function of 2 that lies between the lines 1 and 2. It has been found that the computation error due to this delay is extremely large. By the present invention, the computation error is minimized although time-shared computation is carried out with the same period.

In some cases wherein the integrator of the following stage has another external input as indicated in FIG. 9(A), it is sometimes preferable to divide this computating circuit into two parts as indicated in FIG. 9(B) and to control for time-sharing only the integrator which accepts signal from nonlinear element.

As described above, by the practice of the present invention it is possible through the use of a small number of nonlinear elements to accomplish computation equivalent to that accomplished in the case wherein a large number of nonlinear elements are used. While the foregoing description relates to the case where the object is to effect economy in the number of nonlinear elements, it is clear that exactly the same time-sharing computation is also possible for linear elements in the part occupied by nonlinear elements in the above example. The invention is not limited in application only to economy in the number of non-linear elements but is applicable also to the case when economy in the number of linear elements is contemplated.

Although the invention is applicable and reducible to practice in various types of analog computer setups, it is also applicable to analog simulators, for example, an analog simulator for a particular use in which the computation object is defined, and, consequently, the frequency of the computer setup and the computation solution are approximately fixed, in which case, a time-sharing computer setup such as that shown in FIG. 2 is designed from the very beginning.

A general-purpose analog computer is so constructed that various analog computating elements in great numbers are installed within the computer, and the terminals of these various computating elements are led out to a patch board, on which connections can be readily made to form any desired computer setup. Accordingly, in the case when, depending on the problem, the number of nonlinear elements or linear elements is insufficient, the time-shared computer setup according to the invention may be connected at will on the patch board. An ordinary general-purpose analog computer, however, is not provided with switches for changeover switching with constant period of the inputs of the various computer setups, driving means to drive these switches, and computation control means for the integrator computer circuits to control the computation of each integrator computer circuit by foreshortening the time axis in synchronism with the aforesaid switching and to place the circuit in a "hold" state at times other than the computing time. Accordingly, the time-sharing computation method of the invention cannot be applied directly to such general-purpose analog computers. Therefore, the present invention can be applied to conventional general purpose analog computers by specially providing the above mentioned means.

It is to be understood, of course, that the foregoing disclosure relates to only a preferred embodiment of the invention and a modification and that it is intended to cover all other changes and modifications of the example of the invention herein chosen for the purposes of the disclosure, which do not constitute departures from the spirit and scope of the invention as set forth in the appended claims.

We claim:

1. A time-shared analog computer comprising: computing circuits used in common for a plurality of channels, first switching means for switching a plurality of input signals of said channels to time-sequentially connect said respective signals to said inputs of said common computing circuits within a predetermined repeating period; a plurality of integrators provided for each of said channels for integrating the respective outputs of said common computing circuits; means for foreshortening time-constants of said respective integrators so as to accomplish computation with foreshortened time axis; and second switching means for switching the respective outputs of said common computing circuits synchronously with said first switching means to connect, successively, said outputs to said respective integrators, said second switching means being grounded so as to cause each integrator to be in a "hold" state during the period other than the computation period thereof.

References Cited

UNITED STATES PATENTS 3,264,456 8/1966 Gruet ----------- 235—150.51

MALCOLM A. MORRISON, *Primary Examiner.*

J. F. RUGGIERO, *Assistant Examiner.*

U.S. Cl. X.R.

235—183